United States Patent [19]

Suganuma

[11] Patent Number: 5,173,631
[45] Date of Patent: Dec. 22, 1992

[54] DRIVING DEVICE FOR ULTRASONIC MOTOR

[75] Inventor: Ryoichi Suganuma, Yokohama, Japan

[73] Assignee: Nikon Corporation, Tokyo, Japan

[21] Appl. No.: 601,677

[22] Filed: Oct. 23, 1990

[30] Foreign Application Priority Data

Oct. 30, 1989 [JP] Japan .................................. 1-282278

[51] Int. Cl.⁵ .......................................... H01L 41/08
[52] U.S. Cl. .................................... 310/316; 310/318; 318/116
[58] Field of Search ................. 310/316, 318; 318/116

[56] References Cited

U.S. PATENT DOCUMENTS

| | | | |
|---|---|---|---|
| 3,975,650 | 8/1976 | Payne | 310/316 |
| 4,510,411 | 9/1985 | Hakamata et al. | 310/316 |
| 4,853,579 | 8/1989 | Kawasaki et al. | 318/116 |
| 4,879,528 | 11/1989 | Gotanda | 310/316 |
| 4,926,084 | 5/1990 | Furutsu et al. | 310/316 |
| 4,954,742 | 9/1990 | Izukawa . | |
| 4,970,656 | 11/1990 | Lo et al. | 318/116 |

FOREIGN PATENT DOCUMENTS

| | | | |
|---|---|---|---|
| 59-111609 | 7/1984 | Japan . | |
| 61-251490 | 4/1986 | Japan . | |
| 0050771 | 2/1989 | Japan | 310/318 |
| 1357915 | 12/1987 | U.S.S.R. | 318/116 |

*Primary Examiner*—Mark O. Budd
*Assistant Examiner*—Thomas M. Dougherty
*Attorney, Agent, or Firm*—Shapiro and Shapiro

[57] ABSTRACT

In a driving device for an ultrasonic motor which includes a stator for generating a travelling vibration wave in an elastic member by the excitation of a piezoelectric member and a rotor pressed into contact with the stator, the rotor being driven by the travelling vibration wave, a drive signal which drives the motor is supplied to the motor through an induction element. A phase difference between signals input to and output from the induction element is measured, and drive of the ultrasonic motor is controlled using the obtained value.

7 Claims, 13 Drawing Sheets

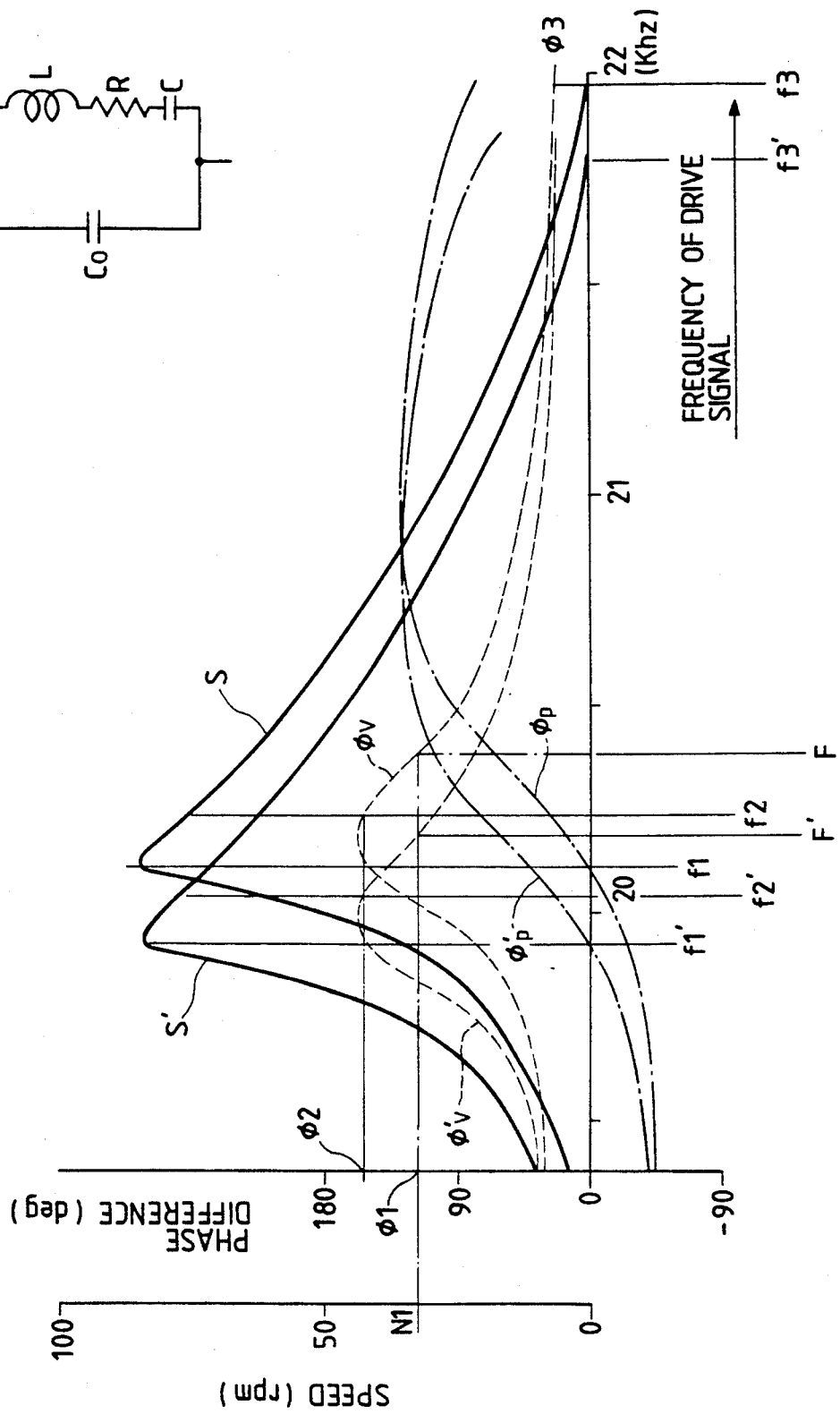

PHASE DIFFERENCE φv

DRIVING DEVICE FOR ULTRASONIC MOTOR

BACKGROUND OF THE INVENTION

1. Field of the Invention

The present invention relates to a driving device for an ultrasonic motor which drives a rotor of the motor using a travelling vibration wave generated in an elastic member by means of a piezoelectric member.

2. Related Background Art

In ultrasonic motors which utilize a travelling vibration wave, a piezoelectric member is vibrated by the application of an alternating drive voltage, and a travelling vibration wave is thereby generated in an elastic member adhered to the piezoelectric member to frictionally drive a rotor which is in contact with the elastic member. Such ultrasonic motors have been disclosed in, for example, Japanese Patent Laid-Open No. 59-111609.

FIG. 2 is a schematic cross-sectional view of such an ultrasonic motor, and FIG. 3 is a plan view of an ultrasonic motor as seen when looking from the direction of a piezoelectric member.

In the ultrasonic motor shown in FIGS. 2 and 3. a piezoelectric member 8-2 is adhered to one surface of an elastic member 8-1. The elastic member 8-1 and the piezoelectric member 8-2 in combination constitute a vibrating member 8-3. A rotating member 8-5 is in contact with the other surface of the elastic member 8-1 with a slider 8-4 therebetween. The slider 8-4 and the rotating member 8-5 in combination form a rotor 8-6.

As shown in FIG. 3, the piezoelectric member 8-2 has on its surface four electrodes 8-2a, 8-2b, 82c and 8-2d. $\pi/2$ out-of-phase alternating drive voltages are applied to the drive electrodes 8-2a and 8-2b. The electrode 8-2c is grounded. The electrode 8-2d is used to take out an alternating output voltage which corresponds to the vibrations of the vibrating member 8-3.

Drive controlling devices for such an ultrasonic motor have been proposed in, for example, U.S. Pat. No. 4,510,411 and Japanese Patent Laid-Open No. 61-251490. These drive controlling devices are designed to control the frequency of an alternating drive voltage signal (1) using a voltage taken out from the monitor electrode 8-2d or (2) using a phase difference between an alternating voltage signal applied to the piezoelectric member and a voltage signal output from the monitor electrode.

However, the system designed to control the frequency of the alternating drive voltage signal using the alternating voltage signal output from the monitor electrode has the following drawbacks.

(1) Since the area of the monitor electrode 8-2d is in general smaller than that of the driving electrode 8-2a or 8-2b, it has a high impedance, and is thus readily affected by a circuit connected thereto.

(2) The output of the monitor electrode 8-2d varies when the drive direction is altered due to a shift in the positional relation between the driving electrodes 8-2a and 8-2b and the monitor electrode 8-2d or because of errors in the area of the monitor electrode 8-2d.

(3) As the frequency of the alternating drive voltage signal applied to the drive electrodes 8-2a and 8-2b deviates from the resonant frequency inherent to the ultrasonic motor, the amplitude of the travelling vibration wave decreases, dropping the voltage output from the monitor electrode 8-2d. This makes detection of the output of the monitor electrode 8-2d impossible on occasions when the frequency of the alternating drive voltage signal is controlled to a value which greatly deviates from the resonant frequency so as to reduce the speed. In that case, distortion occurs in the waveform of the output of the monitor electrode 8-2d. This makes measurement of the phase difference between the alternating drive voltage signal and the output of the monitor electrode 8-2d difficult.

(4) The problem labelled (3) occurs again when the alternating drive voltage is dropped to reduce the speed of the motor.

(5) Since the phase difference between the rectangular wave of the alternating drive voltage and the waveform of the output of the monitor electrode 8-2d shifts because of reversal of the direction of the motor rotation, a circuit for shifting the phase of the alternating drive voltage for each reversal is required.

SUMMARY OF THE INVENTION

An object of the present invention is to control the speed of an ultrasonic motor by controlling the frequency of an alternating drive voltage signal applied thereto without detecting a monitor voltage signal.

In order to achieve the above-described object, the present inventors devised the present invention on the basis of the following experiments.

As shown in FIG. 4, 3.9 mH inductive elements L1 and L2 were respectively connected to the drive electrodes 8-2a and 8-2b of the piezoelectric member, and $\pi/2$ out-of-phase square waves were applied to the inductive elements L1 and L2. The frequency of the square waves, i.e., the frequency of the drive signal applied to the ultrasonic motor, was varied, and how the speed S of the rotor of the ultrasonic motor, the phase difference $\phi p$ between the waveform of the voltage applied to the ultrasonic motor and that of the voltage output from the monitor electrode 8-2d, and the phase difference $\phi v$ between the square wave applied to the inductive element L1 and the voltage waveform applied to the ultrasonic motor, i.e., the change in phase difference between the signals input to and output from the inductive element L1, at that time were observed. These characteristics are shown in FIG. 5 as S, $\phi p$ and $\phi v$.

In FIG. 5, f1 denotes the resonant frequency of the ultrasonic motor, and f2 denotes the lower limit of the frequency range of the drive signal in which the ultrasonic motor can be operated stably without generating noise. In the experiments conducted by the present inventor, f1=20.1 (kHz), and f2=20.22 (kHz).

It is estimated that the phase difference $\phi v$ changes in the manner shown in FIG. 5 for the following reasons.

An equivalent circuit for the ultrasonic motor is shown in FIG. 6. In the circuit shown in FIG. 6, C0 denotes an electric capacitance. It is known that L, R and C in combination form a series resonance circuit which drives the ultrasonic motor. When the ultrasonic motor is resonant i.e., when the ultrasonic motor is driven by a signal having a frequency of f1 shown in FIG. 5, L and C in the equivalent circuit are tuned to resonance. When the frequency of the drive signal is changed in the vicinity of the resonant frequency, the phase thereof also changes because of a large equivalent impedance. This may be the reason why changes in the frequency of the drive signal change the phase difference $\phi v$ in the manner shown in FIG. 5.

It is also known that the resonant frequency of the ultrasonic motor changes as the environments change, e.g., as the ambient temperature changes. Speed S', a phase difference $\phi v'$ and a phase difference $\phi p'$ in FIG. 5 respectively denote the results of the experiments obtained when the temperature has been changed. As shown in FIG. 5, the resonant frequency f1 of the ultrasonic motor has been changed to f1', and the lower limit f2 of the frequency range of the drive signal has been changed to f2'. However, the phase difference $\phi v'$ which ensured the lower limit f2' of the drive frequency range was substantially the same as the phase difference $\phi v$ which ensured f2. This means that drive of the ultrasonic motor can be controlled using the phase difference $\phi v$ of the signals input to and output from the inductive element, not using either the phase difference $\phi p$ between the monitor signal and the drive signal nor the voltage output from the monitor electrode 8-2d. f3 and f3' in FIG. 5 respectively denote the frequency of the drive signal at which the ultrasonic motor stops. Both the voltage of the square waves applied to the inductive elements L1 and L2 and the voltage applied to the ultrasonic motor are so high and the impedance of the inductive elements L1 and L2 is so low that the voltage is not readily affected by the circuits connected thereto to measure the phase difference $\phi v$.

The aforementioned object of the present invention is achieved by the provision of a drive device for an ultrasonic motor which comprises means for forming a drive signal to be applied to a piezoelectric member, power supply means for supplying the drive signal to the piezoelectric member through an inductive element, means for measuring a phase difference between the signals input to and output from the inductive element, and means for controlling the drive signal using the measured phase difference.

The phase difference between the signals input to and output from the inductive element changes in correlation with the frequency of the drive signal. Hence, it is possible to control the drive of the ultrasonic motor, without using the signal taken out from the monitor electrode, by measuring the phase difference between the signals input to and output from the inductive element and by controlling the frequency of the drive signal in accordance with the measured phase difference. In that case, it is also possible to solve the problems arising from the use of the monitor signal from the monitor electrode.

BRIEF DESCRIPTION OF THE DRAWINGS

FIG. 5 is a graph showing the relation between the speed of the ultrasonic motor and the phase difference relative to the frequency of a drive signal;

FIG. 6 shows an equivalent circuit for the ultrasonic motor;

DETAILED DESCRIPTION OF THE PREFERRED EMBODIMENTS

First Embodiment

Figure 1:
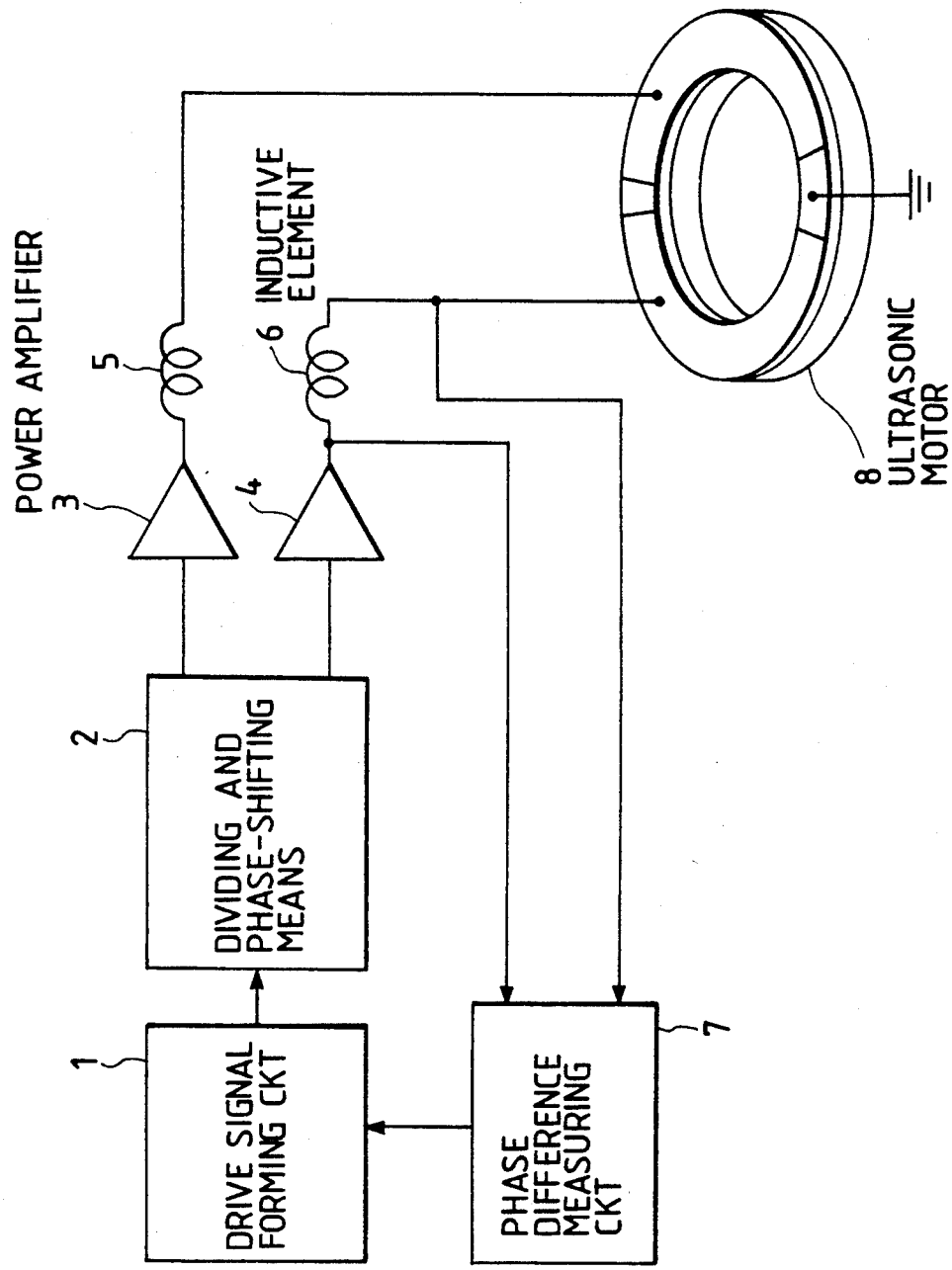
FIG. 1 is a schematic view of an ultrasonic motor drive device according to the present invention.
Figure 2:
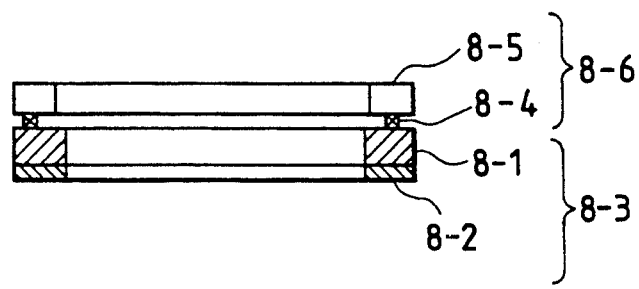
FIG. 2 is a cross-sectional view of an ultrasonic motor.
Figure 3:
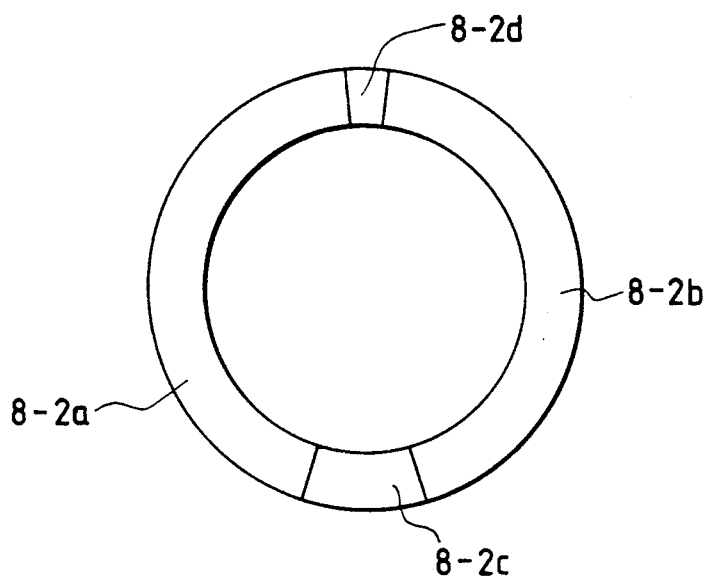
FIG. 3 is a plan view of the ultrasonic motor of FIG. 2 as seen when looking from the direction of a piezoelectric member.
Figure 4:
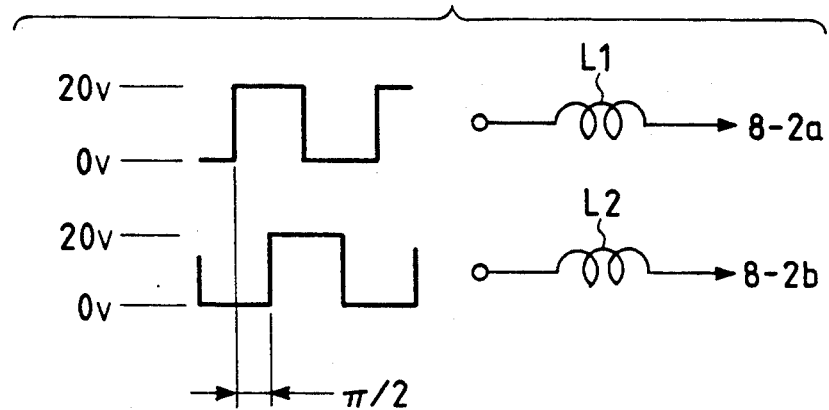
FIG. 4 shows inductive elements and voltages applied thereto.
Figure 7:
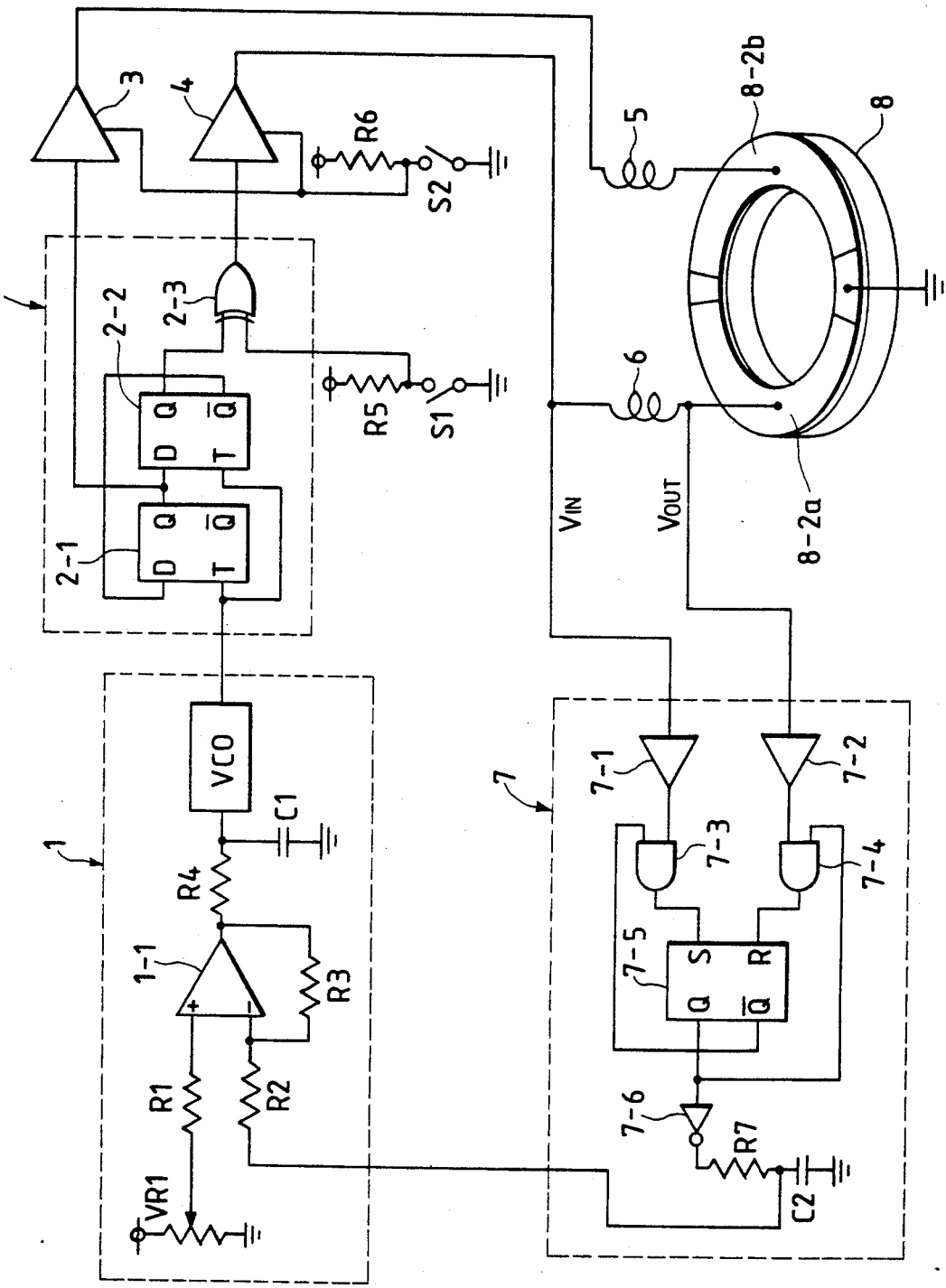
FIG. 7 is a circuit diagram of a first embodiment of the present invention.

FIG. 1 is a block diagram of the first embodiment of the present invention, and FIG. 7 is a 1 detailed circuit diagram of the first embodiment.

Referring first to FIG. 1, a drive control device includes a drive signal forming circuit 1 for generating a drive signal to be applied to the piezoelectric member and for controlling the frequency of the drive signal, a dividing and phase-shifting circuit 2 for dividing the frequency of the two drive signals to be input to the motor and for shifting the phase thereof by $\pi/2$, power amplifiers 3 and 4 for amplifying the drive signals to form alternating drive voltage signals, inductive elements 5 and 6, and a phase difference measuring circuit 7 for measuring the phase difference between the signals input to and output from the inductive element 6 and for outputting a control signal whose voltage is dependent on the magnitude of the measured phase difference. The drive control device shown in FIG. 1 is designed to control the frequency of the alternating drive voltage signal such that the phase difference $\phi v$ between the signals input to and output from the inductive elements 6 reaches a preset value.

The individual components of the drive control device will now be described in detail with reference to FIG. 7.

First, the drive signal forming circuit 1 will be detailed. A variable resistor VR1 sets the reference value of the phase difference $\phi v$. A variable terminal of the variable resistor VR1 is connected to a noninverting terminal of an, operational amplifier 1-1 through a resistor R1. An inverting terminal of the operational amplifier 1-1 is connected to an output terminal of the phase difference measuring circuit 7 through a resistor R2. A resistor R3 is a feedback resistor, by means of which the operational amplifier 1-1 forms a differential amplifier which detects a difference in the voltage between the reference phase difference set by the variable resistor VR1 and the voltage corresponding to the phase difference measured by the phase difference measuring circuit 7. The output of the differential amplifier 1-1 is connected to a lowpass filter constituted by a resistor R4 and a capacitor C1, which is in turn connected to a voltage controlled oscillator VCO. The voltage controlled oscillator VCO outputs a signal whose frequency is dependent on the voltage output from the differential amplifier through the lowpass filter. The gain of the differential amplifier and the time constant of the lowpass filter are determined by the characteristics of the ultrasonic motor and those of the loads.

The dividing and phase-shifting circuit 2 is constructed by two D flip-flops 2-1 and 2-2 and an exclusive OR gate 2-3. An output Q of the flip-flop 2-1 is connected to a data input D of the flip-flop 2-2, and the inverting output $\overline{Q}$ of the flip-flop 2-2 is connected to a data input D of the flip-flop 2-1. An output Q of the flip-flop 2-2 is connected to one of the input terminals of the exclusive OR gate 2-3. The other input terminal of the exclusive OR gate 2-3 is connected to a connection between one end of a resistor, R5 and a rotational direction switch-over switch SL that is grounded when the switch is on. The voltage of the power source is applied to the other end of resistor R5. Thus a signal whose level is dependent on the opening/closing of the switch S1 is applied to the other input terminal of the exclusive OR gate 2-3. This allows the rotational direction of an ultrasonic motor 8 to be changed over in response to the on/off of the switch S1.

In the thus-arranged dividing and phase-shifting circuit 2, the pair of flip-flops 2-1 and 2-2 divides the frequency of the signal output from the drive signal forming circuit 1 and shifts the phase thereof by $\pi/2$. The exclusive OR gate 2-3 outputs the Q output of the flip-flop 2-2 as it is or after it inverts it depending on the opening/closing of the switch S1.

Known power amplifiers 3 and 4 amplify the signals output from the dividing and phase-shifting circuit 2 to produce alternating drive voltage signals and apply the drive voltage signals to the electrodes 8-2$a$ and 8-2$b$ of the piezoelectric member 8-2 through the inductive elements 5 and 6. The power amplifiers 3 and 4 are not operated when a start instruction switch S2 is on. When the switch S2 is off, power is supplied from a power source to the power amplifiers 5 and 6 through a resistor R6 to operate them. The inductive elements 5 and 6 are matching inductive elements which remove undesired frequency components of the outputs of the power amplifiers 3 and 4 to produce substantially sine waves and which raise the voltages applied to the ultrasonic motor.

Figure 8:
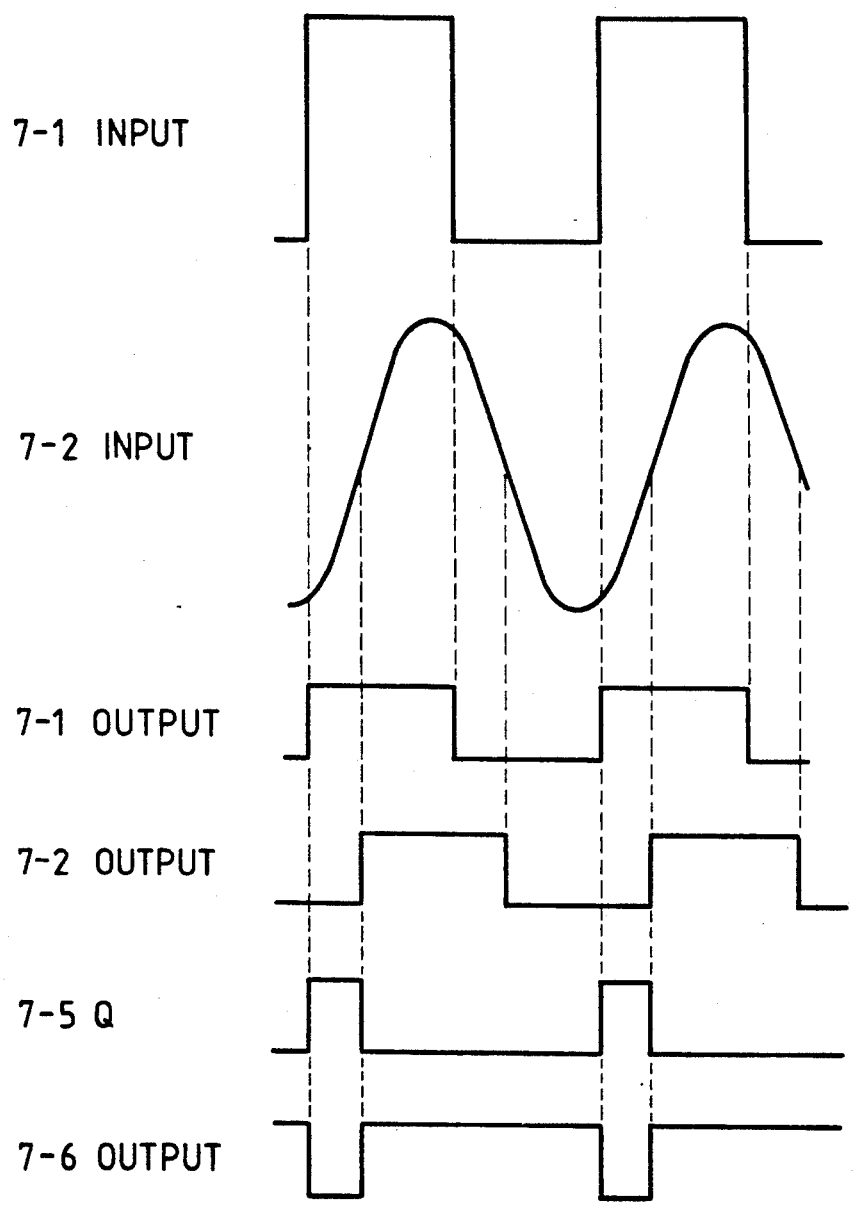
FIG. 8 shows the waveform of the signals of the first embodiment.
Figure 9:
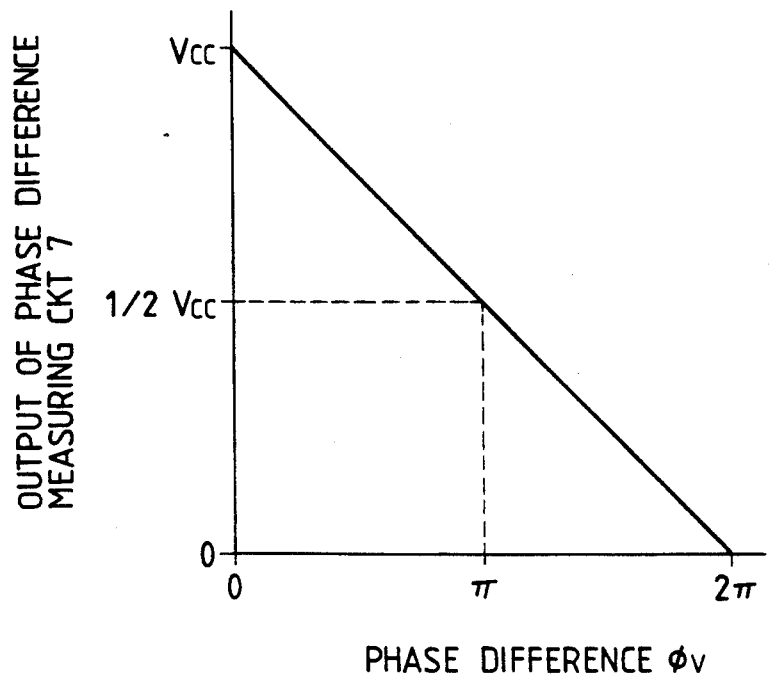
FIG. 9 is a graph showing the relation between the measured phase difference and the output voltage.

The phase difference measuring circuit 7 is designed to measure the phase difference of the signals input to and output from the inductive element 6 and to supply a signal (an input control signal) whose voltage is dependent on the phase difference to the inverting terminal of the operational amplifier 11 1 through resistor R2. The phase difference measuring circuit 7 includes known waveform shaping circuits 7-1 and 7-2 which change the waveform of the signal input thereto into a square wave having a logical level. The signals input to and output from the inductive element 6 are respectively input to the waveform shaping circuits 7-1 and 7-2. That is, a signal $V_{IN}$ output from the amplifier 4 is directly input to the shaping-circuit 7-1, and a signal $V_{OUT}$ output from the amplifier 4 is input to the shaping circuit 7-2 through the inductive element 6, i.e., the voltage signal applied to the ultrasonic motor 8 is input to the shaping circuit 7-2. The outputs of the waveform shaping circuits 7-1 and 7-2 are respectively input to one of the input terminals of an AND gate 7-3 and one of the input terminals of an AND gate 7-4. The output of the AND gate 7-3 is input to an S input of a R-S flip-flop 7-5, and the output of the AND gate 7-4 is input to an R input of the R-S flip-flop 7-5. A Q output terminal of the R-S flip-flop 7-5 is connected to the other input terminal of the AND gate 7-4, and a $\overline{Q}$ output terminal of the R-S flip-flop 7-5 is connected to the other input terminal of the AND gate 7-3. The AND gates 7-3 and 7-4 and the R-S flip-flop 7-5 in combination constitute a known edge-triggered R-S flip-flop. The Q output of the flip-flop 7-5 is also input to an inverter 7-6 whose inverted output is input to a lowpass filter composed of a resistor R7 and a capacitor C2 to produce an integrated output of the phase difference measuring circuit 7. The waveforms of the signals associated with the phase difference measuring circuit 7 will be described with reference to FIG. 8.

The signal output from the Q output of the R-S flip-flop 7-5 is one whose duty cycle is dependent on the phase difference between the waveforms which appear at the two ends of the inductive element 6. The Q output of the R-S flip-flop 7-5 is inverted by the inverter 7-6, and then passed through the lowpass filter comprised of the resistor R7 and the capacitor C2 to obtain a signal whose voltage is dependent on the phase difference $\phi v$ between the signal $V_{IN}$ input to and the signal $V_{OUT}$ output from the inductive element 6. The obtained voltage is output from the phase difference measuring circuit 7 to the operational amplifier 1-1 through the resistor R2 of the drive signal forming circuit 1.

Next, the operation of the drive control device will be described.

When the switch S2 is on and the amplifiers 3 and 4 are thus not operated, the ultrasonic motor 8 is at a stop. The direction of the drive is set by means of the switch S1 in this state. At that time, since there exists no input to the phase difference measuring circuit 7, the Q output of the R-S flip-flop 7-5 is at a high or low level. Thus, the output voltage of the phase difference measuring circuit 7 is either the power source voltage or zero (V) depending on the state of the Q output.

In a case where a rotational speed of the ultrasonic motor 8 is to be set to N1, the resistance of the variable resistor VR1 is determined in the manner described below.

As can be seen from the graph of FIG. 5, the phase difference $\phi v$ which ensures the speed N1 is $\phi 1$. Hence, the voltage which is to be output from the variable resistor VR1 is set to the voltage output from the phase difference measuring circuit 7 when it measures a phase difference of $\phi 1$. At that time, if the Q output of the R-S flip-flop 7-5 when the ultrasonic motor is at a stop is at a high level and the voltage output from the phase difference measuring circuit 7 is thus equal to the power source voltage, i.e., the phase difference measured by the phase difference measuring circuit 7 is zero, the operational amplifier 1-1 outputs substantially zero voltage. On the other hand, if the Q output of the RS flip-flop 7-5 when the ultrasonic motor is at a stop is at a low level and the output voltage of the phase difference measuring circuit 7 is thus equal to zero voltage, i.e., the phase difference measured by the phase difference measuring circuit 7 is $2\pi$, the operational amplifier 1-1 outputs substantially power source voltage. Therefore, the ultrasonic motor can be stably started in either case without being operated in an unstable frequency range by setting the relation between the input voltage and the frequency of the output signal of the voltage controlled oscillator VCO such that the lower limit of the frequency range is f2×4 when the input voltage is zero (V) and such upper limit of the frequency range is f3×4 when the input voltage is the power source voltage.

Hereinafter, a description will be given on the basis of the assumption that the output voltage of the phase difference measuring circuit 7 when the ultrasonic motor 8 is at a stop is zero (V). Therefore, the oscillation frequency of the voltage controlled oscillator VCO when the motor is started is f3 ×4.

Once the ultrasonic motor is started by turning off the switch S2, drive of the motor starts with a drive signal having a frequency of f3, and the phase difference measuring circuit 7 starts measuring the phase difference between the signals $V_{IN}$ and $V_{OUT}$ input to and output from the inductive element 6 to produce a signal whose voltage is dependent on the measured phase difference. Since the phase difference when the motor is started is smaller than the phase difference $\phi 1$ set by the variable resistor VR1, as shown in FIG. 5, the output voltage of the phase difference measuring circuit 7 rises, the output voltage of the operational amplifier 1-1 drops, and the output frequency of the voltage controlled oscillator VCO starts lowering from the frequency with which the motor has been started. In consequence, the frequency of the drive signal changes also, thereby changing the phase difference between $V_{IN}$ and $V_{OUT}$. As the output frequency of the voltage controlled oscillator VCO lowers, the phase difference $\phi v$ increases, thereby increasing the driving speed of the motor. Finally, the frequency of the drive signal for the ultrasonic motor is controlled such that the voltage set in the variable resistor VR1 is equal to the output voltage of the phase difference measuring circuit 7, i.e., such that the phase difference $\phi v$ reaches the value $\phi 1$ set by the variable resistor VR1, and stable drive and a substantially desired driving speed are thus achieved.

In a case where the output voltage of the phase difference measuring circuit 7 when the motor is at a stop is the power source voltage, the motor is activated with a drive signal whose frequency is f2, and the frequency of the drive signal is controlled thereafter such that the output of the phase difference measuring circuit 7 becomes equal to the set value. In this embodiment, the signals which are input to and output from the inductive element 6 are input to the phase difference measuring circuit 7. However, the signals which appear at the two ends of the inductive element 5 may be input to the phase difference measuring circuit 7.

Second Embodiment

In the first embodiment, the first condition expressed in the graph of FIG. 5 by the speed S and the phase difference $\phi v$ has been described. However, it is known that the characteristics of the ultrasonic motor, such as the speed S and the phase difference $\phi v$, change because of the changes in the environments or loads. When the temperature changes and the characteristics of the motor thereby change to, for example, the second condition expressed by a speed S' and a phase difference $\phi v'$ in FIG. 5, the frequency of the drive signal which ensures the phase difference $\phi 1$ and the speed N1 changes to F'. In the above-described first embodiment, it is impossible to obtain a frequency of the drive signal F' ( <f2) because the frequency of the signal output from the voltage controlled oscillator VCO is set from f2×4 to f3×4 (f2<f3). This means that the ultrasonic motor cannot be rotated at the speed N1 when the characteristics of the motor change from the first condition to the second condition. This problem may be solved by changing the lowest frequency of the signal output from the voltage controlled oscillator VCO from f2×4 to f2' ( <F')×4. However, this arouses the following problem.

In a case where the characteristics of the ultrasonic motor are in the first condition, the lowest frequency of the drive signal with which the ultrasonic motor can be stably driven is f2 ( >f2'). Therefore, when the frequency of the signal output from the voltage controlled oscillator VCO when the ultrasonic motor is started is f2'×4, activation of the motor with f2', which is in an unstable frequency region, makes the operation of the motor unstable.

Hence, in the second embodiment, the frequency of the drive signal with which the ultrasonic motor is activated is determined in the manner described below. Although the frequency of the drive signal which ensures a given rotational speed changes as the environments or loads change, the frequency of the drive signal with which the ultrasonic motor is activated is set to a value higher than the lowest frequency with which the motor can be operated stably under the condition which ensures the highest drive frequency (i.e., under the condition which ensures the speed S). If the first condition shown in FIG. 5 ensures the highest frequency of the drive signal, as in the case shown in FIG. 5, stable operation of the motor can be obtained by setting the frequency of the drive signal with which the motor is activated to a value higher than f2.

Figure 10:
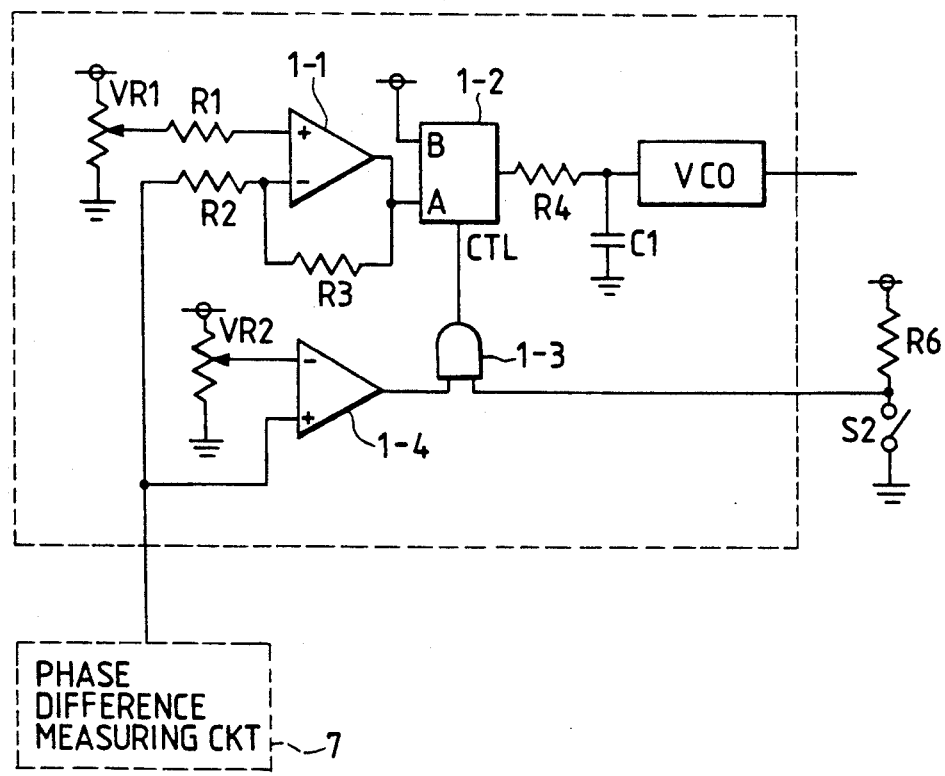
FIG. 10 is a diagram of a phase difference measuring circuit, showing a second embodiment of the present invention.

The second embodiment will now be described in detail with reference to FIG. 10. The structure of the second embodiment differs from that of the first embodiment in that an analog multiplexer 1-2, an AND gate 1-3, a comparator 1-4 and a variable resistor VR2 are incorporated in the drive signal generating circuit 1 shown in FIG. 7. The second embodiment solves the aforementioned problem by setting the lowest frequency of the output from the voltage controlled oscillator VCO to f2'×4 and the highest frequency thereof to f3×4. Other structure being the same as that shown in FIG. 7, illustration thereof is omitted.

The output terminal of the operational amplifier 1-1 is connected to an input terminal A of the analog multiplexer 1-2, and an input terminal B of the analog multiplexer 1-2 is connected to a power source. The output terminal of the analog multiplexer 1-2 is connected to the voltage controlled oscillator VCO through a low-pass filter composed of the resistor R4 and the capacitor C1. A control (CTL) terminal of the analog multiplexer 1-2 is connected to an output terminal of an AND gate 1-3. When the control terminal is at a high level, the input A is selectively output from the analog multiplexer 1-2. With the control terminal being at a low level, the input B is selectively output.

Since one of the input terminals of the AND gate 1-3 is connected to the starting switch S2, a high level signal is input to that input terminal when the ultrasonic motor is driven, while a low level signal is input when the motor is at a stop. The other input terminal of the AND gate 1-3 is connected to an output terminal of a comparator 1-4. A noninverting input terminal of the comparator 1-4 is connected to the output terminal of the phase difference measuring circuit 7, and an inverting input terminal thereof is connected to a variable terminal of a variable resistor VR2. The comparator 1-4 compares the voltage set in the variable resistor VR2 with that output from the phase difference measuring circuit 7, and outputs a high level signal when the voltage from the phase difference measuring circuit 7 is higher than that set in the variable resistor VR2, i.e., when the phase difference φv measured by the phase difference measuring circuit 7 at that instant of time is smaller than that set by the variable resistor VR2. Conversely, when the voltage of the signal output from the phase difference measuring circuit 7 is lower, i.e., when the measured phase difference φv is larger, the phase comparator 1-4 outputs a low level signal. Now, a phase difference φ1 is set by the variable resistor VR1, and a phase difference φ2, which corresponds to the lowest frequency f2 of the drive signal with which the motor can be operated stably in the first condition, is set by the variable resistor VR2 The circuit comprised of the comparator 1-4 and the variable resistor VR2 is called a phase difference limitation detecting circuit.

In a state in which the starting switch S2 is on and the ultrasonic motor is at a stop, the output of the AND gate 1-3 is at a low level regardless of the output of the comparator 1-4, and the B input of the analog multiplexer 1-2 is selected. In consequence, the voltage of the signal output from the lowpass filter comprised of the resistor R4 and the capacitor C1 is the power source voltage, this voltage being input to the voltage controlled oscillator VCO. As stated above, the frequency of the drive signal output from the voltage controlled oscillator VCO when the voltage of the signal input thereto is zero (V) is f2'×4, and the frequency when the voltage input is the power source voltage is f3×4. So, the voltage controlled oscillator VCO outputs a signal having a frequency of f3×4 when the ultrasonic motor is at a stop.

Once the starting switch S2 has been turned off and the ultrasonic motor has thereby been activated, since the frequency of the signal output from the voltage controlled oscillator VCO when the motor is activated is f3×4, alternating drive voltage signals having a frequency of f3 are supplied to the ultrasonic motor from the power amplifiers 3 and 4. At that time, the phase difference measuring circuit 7 outputs a signal whose voltage corresponds to the phase difference φ3 (in FIG. 5) which ensures a drive frequency f3. This signal output from the phase difference measuring circuit 7 is input to the comparator 1-4 of the phase difference limitation detecting circuit also. The comparator 1-4 compares the reference phase difference φ2 with the input phase difference and outputs a high level signal because φ3 < φ2. In consequence, the two inputs of the AND gate 1-3 are at a high level, and the output thereof is also at a high level. This makes the analog multiplexer 1-2 select the input A. At that time, since the phase difference φ3 < phase difference φ1, the output of the operational amplifier 1-1 drops, and the voltage of the signal input to the voltage controlled oscillator VCO thereby drops, by which the frequency of the drive signal output from the voltage controlled oscillator VCO lowers from f3 until it reaches the value which ensures a phase difference φ1, as in the case of the first embodiment. Thus, the ultrasonic motor can be activated with a frequency higher than the lowest one with which the ultrasonic motor can be operated stably even when the characteristics of the motor obtained when the motor is started represent the first or second condition.

In this embodiment, to set the frequency of the drive signal to F which ensures a rotational speed N1, the phase difference φ1 corresponding to the frequency F is set by the variable resistor VR1. The case where the ultrasonic motor is driven in an unstable frequency range when a phase difference φ2 which ensures the frequency f2 is set in place of the phase difference φ1 to drive the ultrasonic motor at a higher speed will now be considered.

The likely cases include one in which the frequency f2 of the drive signal lowers due to overshoot and one in which the frequency which is set to f2 fluctuates due to instantaneous changes in the load. In this second embodiment, when the phase difference φv exceeds the phase difference φ2, the level of the output of the comparator 1-4 drops, thereby dropping the level of the output of the AND gate 1-2. This makes the analog multiplexer 1-3 select the input B. As a result, the voltage of the signal input to the voltage controlled oscillator VCO rises, and the frequency of the drive signal thereby increases, decreasing the phase difference φv to a value smaller than the phase difference φ2. Once the phase difference φv has dropped to a value smaller than the phase difference φ2, the voltage of the signal output from the phase difference measuring circuit 7 rises, and the level of the output of the comparator 1-4 thus rises. As a result, the analog multiplexer 1-2 selects the input A, and the frequency of the drive signal thereby lowers. When the phase difference φv has reached the phase difference φ2, control which is the same as that described above is conducted again to obtain the stable drive. The phase difference limitation circuit may be used as a drive speed limiter by setting in the phase difference limitation detecting circuit a value smaller than the phase difference φ2 which ensures the lower limit f2.

Third Embodiment

Figure 11:
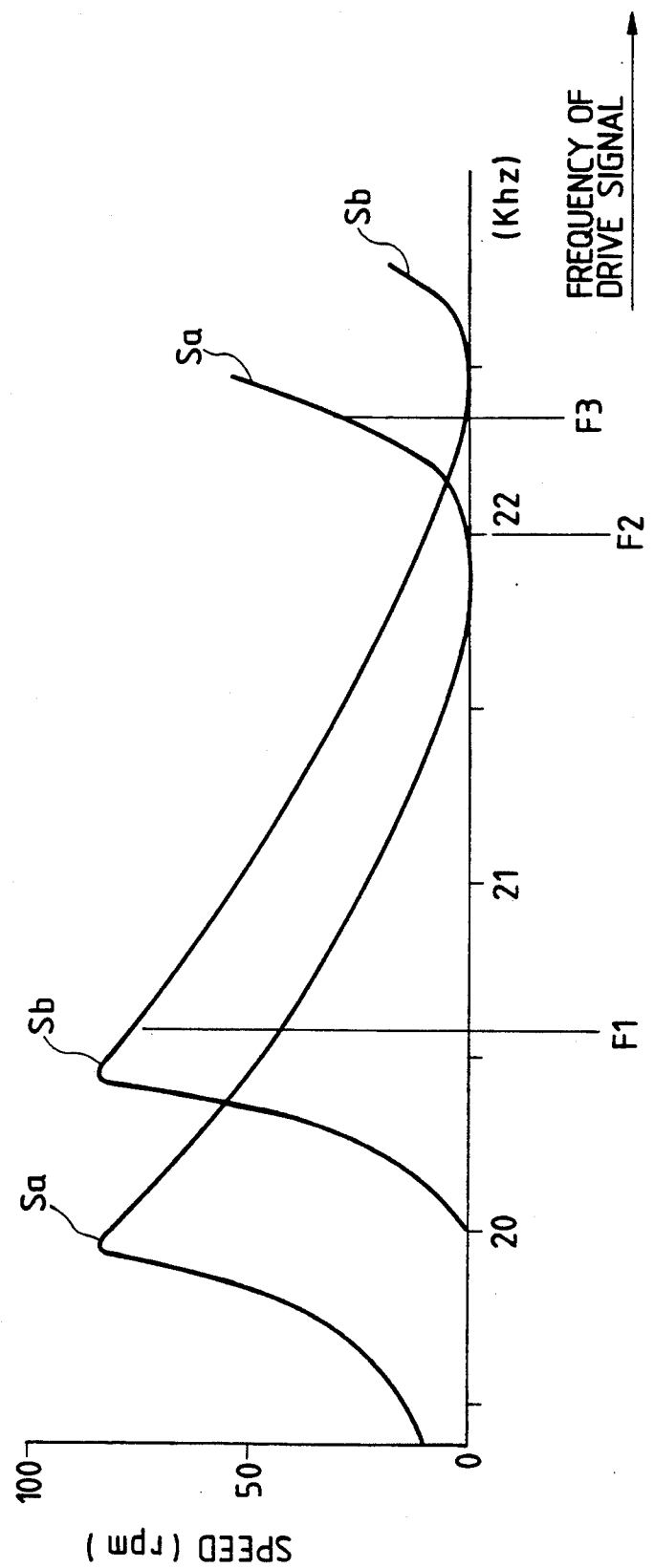
FIG. 11 shows two types of speed characteristics.

In the above-described first and second embodiments, the lower and upper limits of the frequency of the drive signal output from the voltage controlled oscillator VCO are made to coincide with the drive frequency range for the ultrasonic motor. When it is difficult to achieve this coincidence or when a plurality of ultrasonic motors whose frequency range of the drive signal varies are alternately used or operated by the same drive device, the frequency of the drive signal and the drive speed may have a relationship such as that shown in FIG. 11 due to changes in the environments or loads or the like. In FIG. 11, speed characteristics Sa represent lower frequency characteristics and speed characteristics Sb represent higher frequency characteristics.

In both characteristics, the ultrasonic motor may be driven again with a frequency higher than the normally employed one. In the characteristics Sa and Sb, the drive speed rises again when the frequency of the drive signal exceeds 22 kHz. In this drive frequency range in which the drive speed rises again, the direction of the drive is reversed from that in which the ultrasonic motor is driven with normal frequency range, and the motor cannot be driven stably. Therefore, this frequency area is not generally used. However, as can be seen from FIG. 11, in a case where the highest frequency of the signal output from the voltage oscillator VCO is set to a value which ensures the frequency F3 corresponding to the highest drive frequency f3 in the characteristics Sb, if the circuit configuration of the second embodiment is adopted, the ultrasonic motor which exhibits the characteristics Sa may be activated with a frequency which makes the operation thereof unstable.

This problem is solved by setting the frequency of the drive signal with which the motor is started to a value which is higher than the lower limit F1 of the drive frequency (corresponding to f2 shown in FIG. 5) which defines the high speed drive unstable area in the characteristics Sb but lower than a value than the drive frequency F2 which defines the low speed drive unstable area in the characteristics Sa, and stable drive of the ultrasonic motor is thus enabled.

Figure 12:
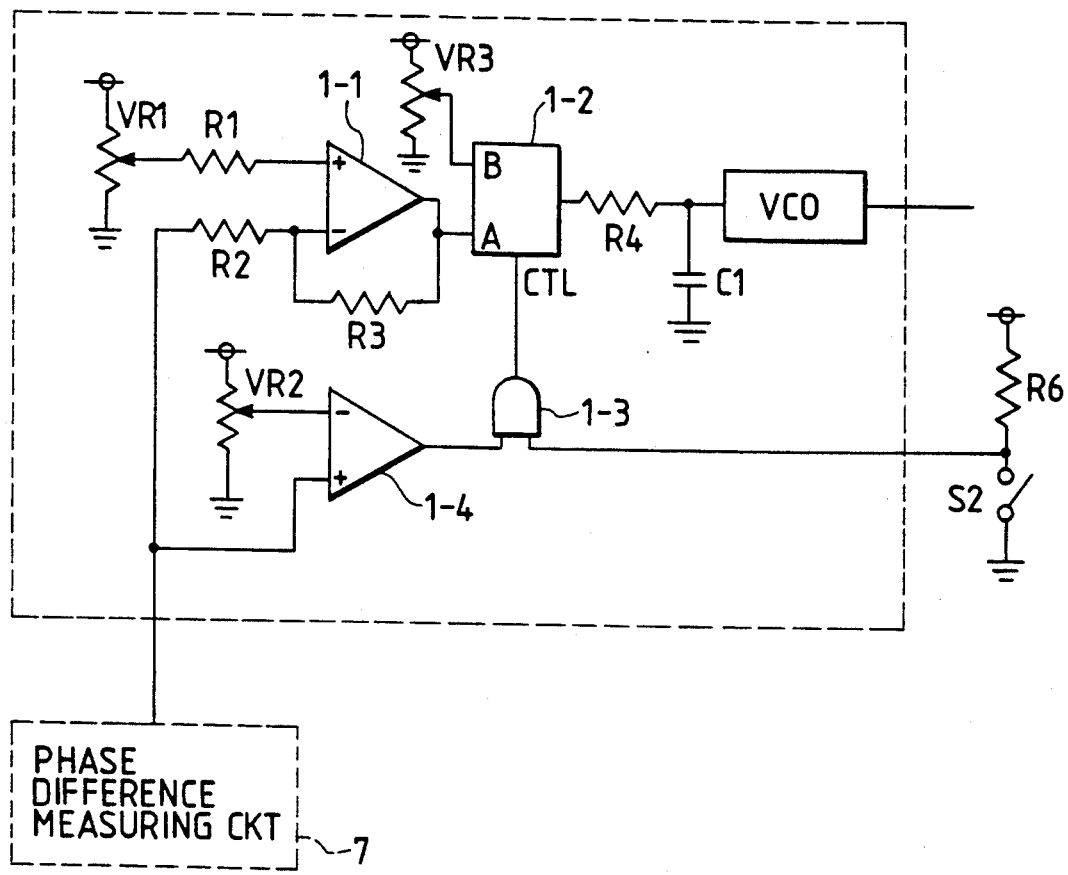
FIG. 12 is a diagram of a drive signal forming circuit employed in a third embodiment of the present invention.

FIG. 12 shows this third embodiment.

In the third embodiment, the B input terminal of the analog multiplexer 1-2 is connected to a variable terminal of a variable resistor VR3, and a resistance which ensures that the frequency of the signal output from the voltage controlled oscillator VCO when the starting switch S2 is on and the motor is thus at a stop ranges from F1×4 to F2×4 is set in the variable resistor VR3. In this way, stable drive of the ultrasonic motor can be obtained even when the frequency of the signal output from the voltage controlled oscillator VCO cannot be made to correspond to a required frequency.

Fourth Embodiment

In the above-described three embodiments, the frequency of the voltage signal applied to the motor is controlled such that the phase difference between the voltage waveform $V_{IN}$ output from the power amplifier 4 and the voltage waveform $V_{OUT}$ input to the ultrasonic motor becomes a desired value. However, the speed of the rotary member of the ultrasonic motor may be detected, and frequency feedback control may be conducted such that the detected drive speed of the rotary member becomes a fixed value.

Figure 13:
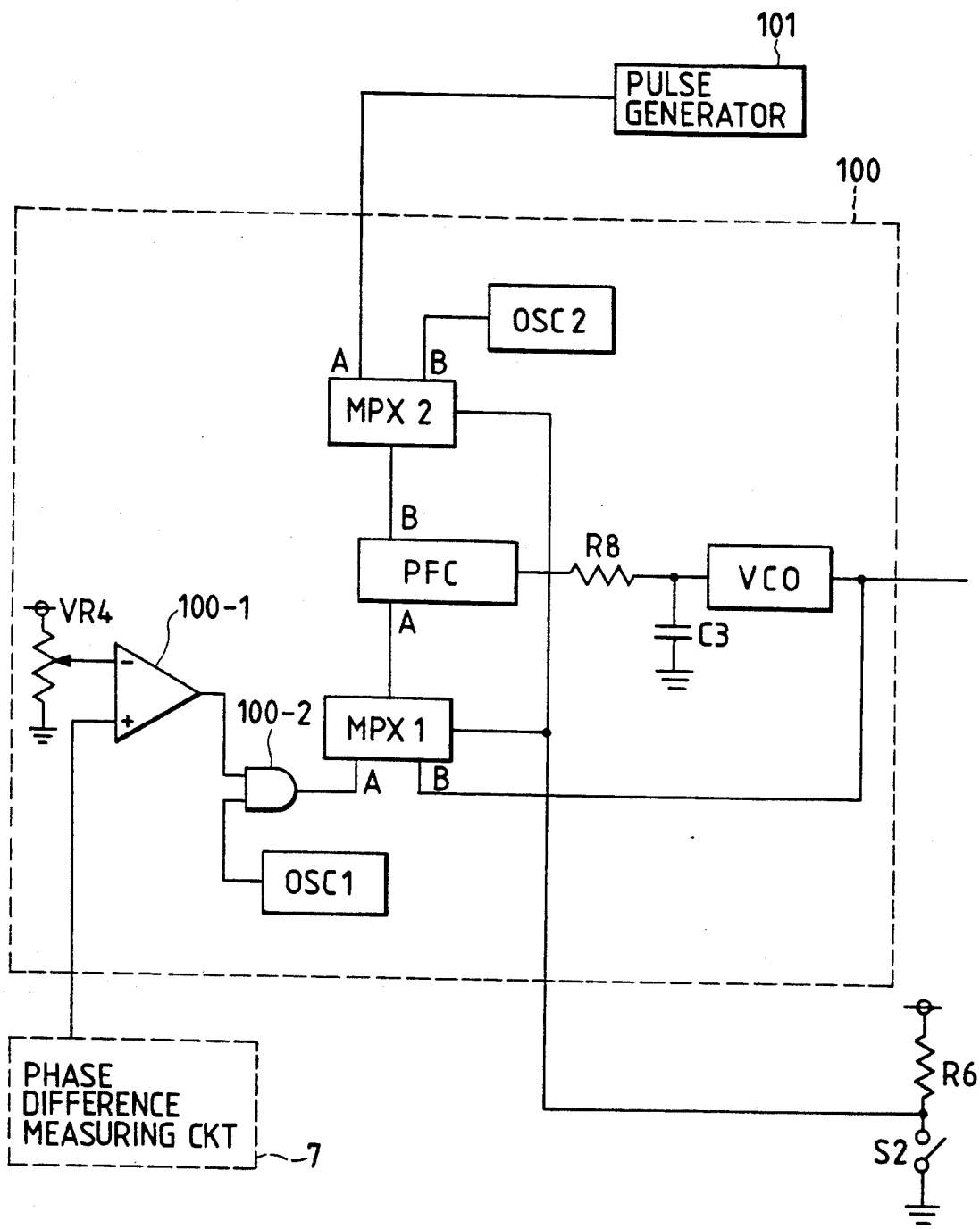
FIG. 13 is a diagram of a drive signal forming circuit employed in a fourth embodiment of the present invention.

FIG. 13 shows a fourth embodiment which carries out that control.

In FIG. 13, the portion enclosed by the broken line denotes a drive signal forming circuit 100 which corresponds to the drive signal forming circuit 1 shown in FIG. 1. A pulse forming circuit 101 generates pulses which are in proportion to the drive speed of the rotary member of the ultrasonic motor. The pulse forming circuit 101 may be a pulse encoder.

The structure of the drive signal forming circuit 100 will be described first. A noninverting input terminal of the comparator 100-1 is connected to the output terminal of the phase difference measuring circuit 7. An inverting terminal of the comparator 100-1 is connected to a variable terminal of a variable resistor VR4 whose one end is connected to the power source. The other end of the variable resistor VR4 is grounded. The comparator 100-1 and the variable resistor VR4 in combination form a phase difference limitation detecting circuit, as in the case of the second embodiment. Hence, a voltage representing the phase difference φ2 corresponding to the lower limit f2 of the drive frequency range shown in FIG. 5 is set in the variable resistor VR4. The output terminal of the comparator 100-1 is connected to one of the input terminals of an AND gate 100-2 whose other input terminal is connected to an oscillator OSC1 to receive a square wave signal therefrom. The output terminal of the AND gate 100-2 is connected to an "A" input terminal of a multiplexer MPX1 whose B input terminal is connected to the output terminal of the voltage controlled oscillator VCO. An "A" input terminal of a multiplexer MPX2 is connected to an output terminal of the pulse forming circuit 101, and a "B" input terminal thereof is connected to an oscillator OSC2 to receive a square wave therefrom. Control terminals of the multiplexers MPX1 and 2 are connected to the starting switch S2 so that the B input thereof can be selected when the starting switch S2 is on and the ultrasonic motor is thus at a stop, while the A input can be selected when the starting switch S2 is off and the ultrasonic motor is thus driven. The outputs of the multiplexers MPX1 and 2 are respectively connected to A input terminal and B input terminal of a known phase frequency comparator PFC whose output terminal is connected to a lowpass filter comprised of a resistor R8 and a capacitor C3. The output of the lowpass filter is connected to an input terminal of the voltage controlled oscillator VCO. The voltage controlled oscillator VCO employed in this embodiment is the same as that employed in the previous embodiments.

When the starting switch S2 is turned on to stop the ultrasonic motor, the B input is selected in both multiplexers MPX1 and 2. Therefore, the signal output from the voltage controlled oscillator VCO and the signal output from the oscillator OSC2 are input to the phase frequency comparator PFC. In this state, the voltage controlled oscillator VCO is PLL controlled such that the signal output from the voltage controlled oscillator VCO and the signal output from the oscillator OSC2 have the same frequency and are in phase. During the PLL control, when the two A and B inputs of the phase frequency comparator PFC have the same frequency and are in phase, the output of the phase frequency comparator PFC assumes a floating state. When the A input is leading the B input, the phase frequency comparator PFC outputs zero (V) in a period corresponding to the phase difference between the two inputs. Conversely, when the B input is leading the A input, the phase frequency comparator PFC outputs a power source voltage in a period corresponding to the phase difference.

Since the output of the phase frequency comparator PFC is integrated by the lowpass filter, in a case where the two inputs of the phase frequency comparator PFC have the same frequency and are in phase, the output of the lowpass filter, i.e., the voltage of the signal input to the voltage controlled oscillator VCO, remains the same. Thus, the frequency of the signal output from the voltage controlled oscillator VCO also remains the same. In a case where the A input is leading the B input, the output of the lowpass filter drops, thereby dropping the frequency of the signal output from the voltage controlled oscillator VCO. In a case where the B input is leading the A input, the voltage of the signal input to the voltage controlled oscillator VCO rises, raising the frequency of the signal output from the voltage controlled oscillator VCO. In a case where the frequency of the A input differs from that of the B input, if A input > B input, the phase frequency comparator PFC outputs zero (V) in accordance with the difference between the two inputs. As a result, the voltage of the voltage input to the voltage controlled oscillator VCO drops, and the frequency of the signal output therefrom thus decreases. Conversely, if A input < B input, the voltage input to the voltage controlled oscillator VCO rises, and the frequency of the signal output therefrom thus increases.

Thus, when the ultrasonic motor is at a stop, PLL control is performed such that the frequency of the signal output from the oscillator OSC2 becomes equal to that of the signal output from the voltage controlled oscillator VCO. Hence, stable activation of the ultrasonic motor is enabled by setting the frequency of the signal output from the oscillator OSC2 to a value ranging between F1 and F2 shown in FIG. 11.

Once the starting switch S2 has been turned off to start the ultrasonic motor, the A input is selected in both multiplexers MPX1 and 2. Since the phase difference measured when the motor has been started is smaller than that set by the phase difference limitation detecting circuit, the output of the phase difference limitation detecting circuit is at a high level, and the output of the oscillator OSC1 is thus input to the A input of the phase frequency comparator PFC while the output of the pulse forming circuit 101 is input to the B input thereof.

In this state, if the oscillation frequency of the oscillator OSC1 > the output frequency of the pulse forming circuit 101, the frequency of the signal output from the voltage controlled oscillator VCO decreases from the one with which the motor has been started, and the speed of the ultrasonic motor thus increases. If the oscillation frequency of the oscillator OSC1 < the output frequency of the pulse forming circuit 101, the frequency of the signal output from the voltage controlled oscillator VCO increases, and the speed of the ultrasonic motor thereby decreases. If the oscillation frequency of the oscillator OSC1 = the output frequency of the pulse forming circuit 101 and if they are in phase, the frequency of the signal output from the voltage controlled oscillator remains the same, and the speed of the ultrasonic motor also remains the same.

Thus, in the fourth embodiment the frequency with which the ultrasonic motor is started automatically changes to a frequency which ensures a desired drive speed by setting the output frequency of the oscillator OSC1 to that obtained by the pulse forming circuit 101 when the ultrasonic motor rotates at a desired speed.

When the frequency set in the oscillator OSC1 ensures the speed of the motor which exceeds its ability, or when the phase difference $\phi v$ between the signals $V_{IN}$ and $V_{OUT}$ which appear at the two ends of the inductive element 6 exceeds $\phi 2$ because of changes in the environments, the level of the output of the phase difference limitation detecting circuit, i.e., the level of the output of the comparator 100-1, drops, thereby dropping the level of the output of the AND gate 100-2. This makes zero frequency appear at the A input terminal of the phase frequency comparator PFC. Because the objective drive speed has become zero, the frequency of the signal output from the voltage controlled oscillator VCO rises to reduce the drive speed of the ultrasonic motor. Consequently, the frequency of the drive signal rises and the phase difference thus reduces to $\phi 2$ or below. When the output of the phase difference limitation detecting circuit has assumed a high level, the frequency of the oscillator OSC1 is input to the A input terminal of the phase frequency comparator PFC, and the drive speed thus increases again. When the phase difference $\phi v$ has reached $\phi 2$, the same operation as that described above is repeated to ensure stable drive control of the ultrasonic motor.

It is thus possible to stably drive the ultrasonic motor without using the monitor electrode by detecting the phase difference $\phi v$ between the voltage waveform output from the power amplifier 4 and the alternating voltage waveform input to the drive electrode 8-2a by means of the phase difference measuring circuit 7 and by conducting drive control using the detected phase difference.

Fifth Embodiment

In the above-described embodiments, the signal (drive frequency $\times 4$) corresponding to the frequency of a drive signal, which is obtained by the drive signal forming circuit 1, is divided and converted into two drive signals which are out of phase by $\pi/2$ by the dividing and phase-shifting circuit 2. Thereafter, the drive signals are amplified by the amplifiers 3 and 4, and the resultant signals are applied to the ultrasonic motor through the inductive elements 5 and 6. The power supply means may also be arranged in the manner shown in FIG. 14.

Figure 14:
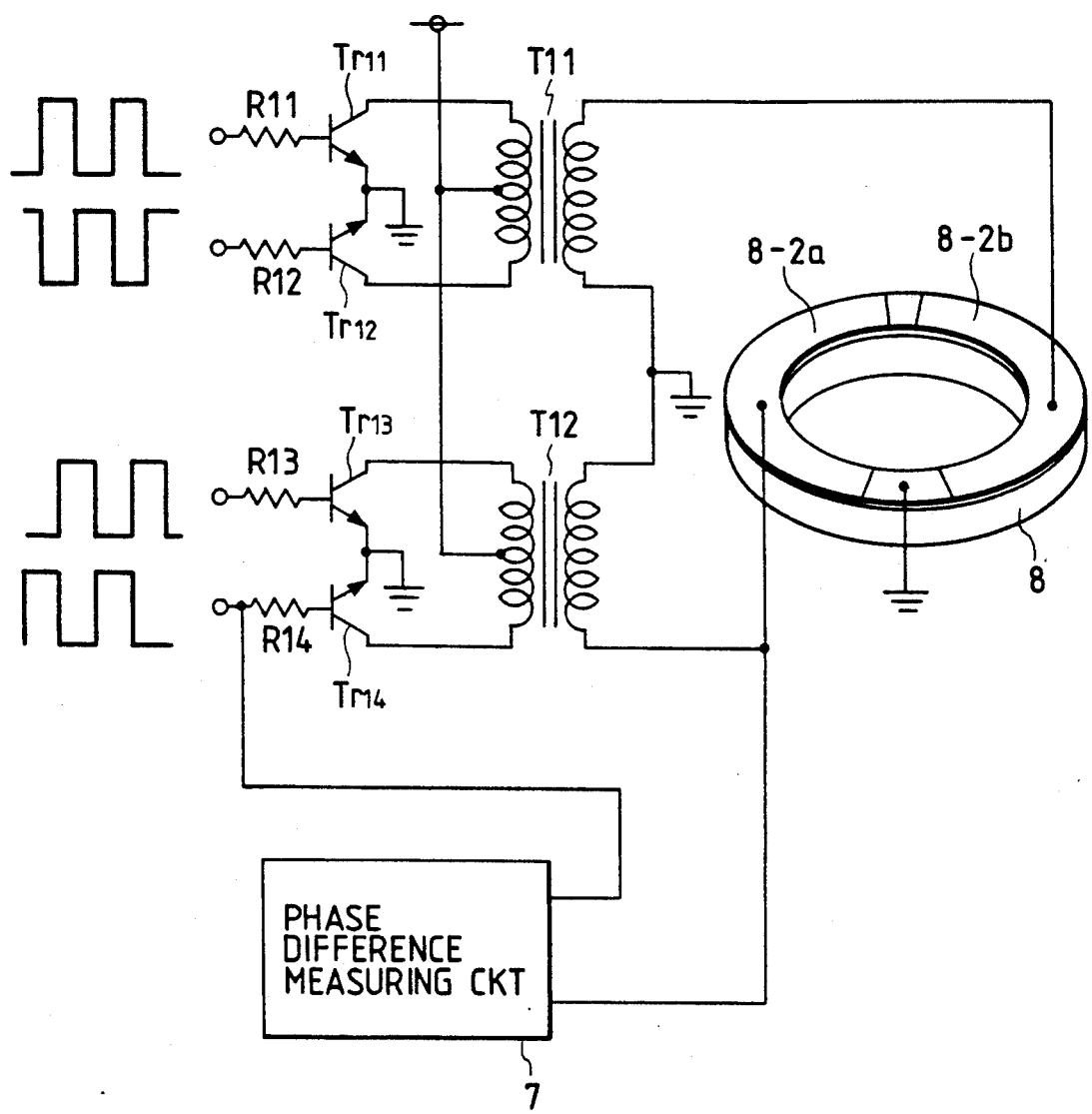
FIG. 14 is a circuit diagram of essential parts of a fifth embodiment of the present invention in which a power supply means employs a transformer.

As shown in FIG. 14, the dividing phase-shifting circuit 2 outputs four out-of-phase pulse signals. These pulses are respectively applied to bases of transistors Tr11 to Tr14 through resistors R11 to R14 to turn on the transistors sequentially and thereby output from the secondary windings of transformers T11 and T12 alternating drive signals which are out of phase by 90 degrees. The drive signals are respectively applied to the drive electrodes 8-2a and 8-2b of the ultrasonic motor 8 to rotate it. The signal waveform which is input to the resistor R14, i.e., that which is input to the transformer T12, and the signal which is output from the transformer T12, i.e., the voltage signal waveform applied to the drive electrode 8-2a, are input to the phase difference measuring circuit 7. That is, the frequency of the drive signal for the ultrasonic motor is controlled on the basis of the phase difference between the signals input to and output from the transformer T12, which serves as the inductive element, to obtain the functions of the above-described embodiments.

Sixth Embodiment

Figure 15:
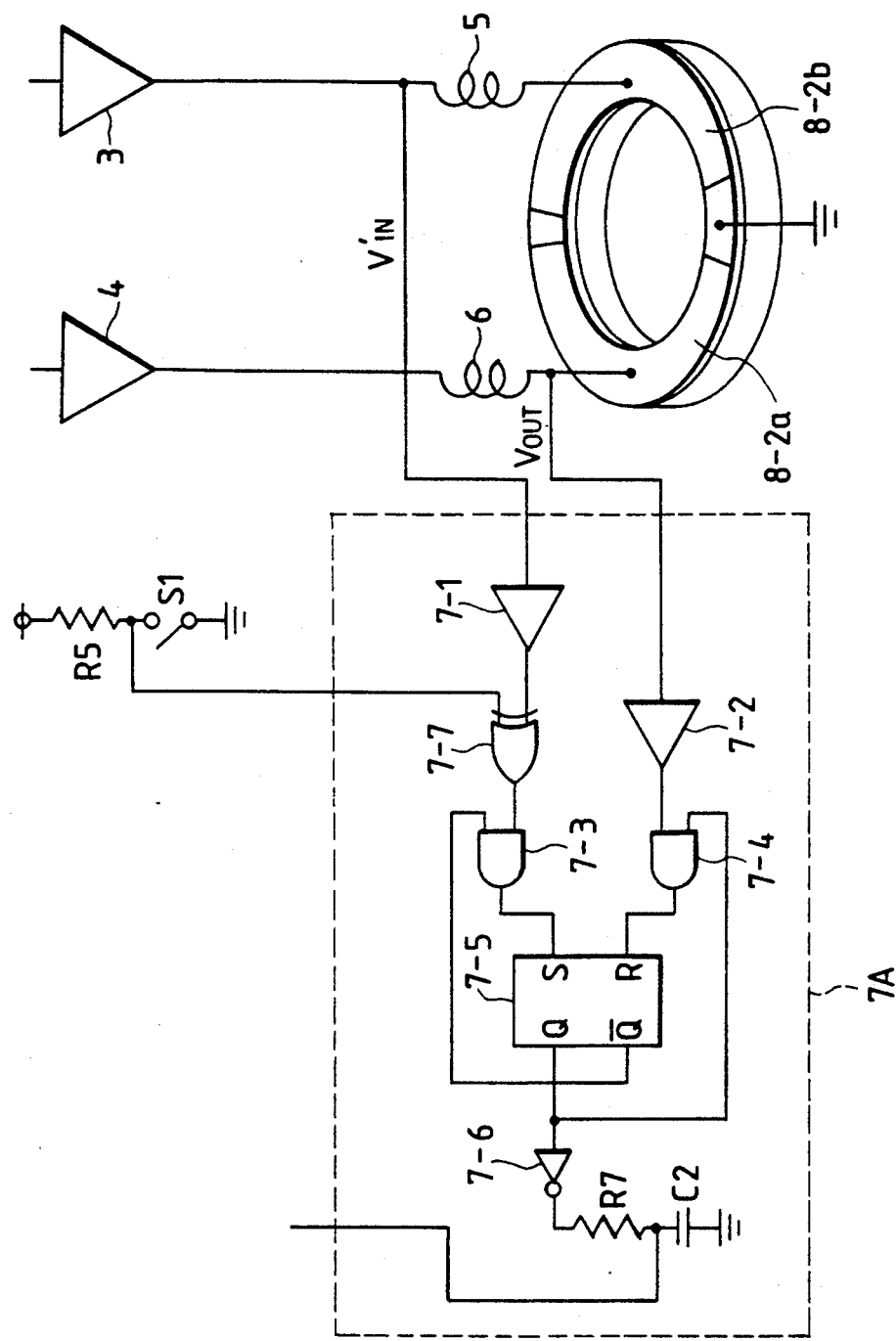
FIG. 15 is a diagram of a phase difference measuring circuit, showing a sixth embodiment of the present invention.

In this embodiment, the signal $V'_{IN}$ input to the inductive element 5 and the signal $V_{OUT}$ output from the inductive element 6 are input to a phase difference measuring circuit 7A to detect the phase difference between the two signals, as shown in FIG. 15, by means of which the same control as that described above is performed.

The signals $V'_{IN}$ and $V_{OUT}$ are originally out of phase by $\pi/2$ and the phase difference relation between the two signals reverses in accordance with the direction of the drive of the ultrasonic motor. Hence, in this embodiment, an exclusive OR gate 7-7 is inserted between the waveform shaping circuit 7-1 and the AND gate 7-3 to eliminate influence of the reversal of the phase difference relation on the phase difference measurement. One of the input terminals of the exclusive OR gate 7-7 is connected to a direction change-over switch S1, and the other input terminal thereof is connected to the output terminal of the waveform shaping circuit 7-1. The output terminal of the exclusive OR gate 7-7 is connected to one of the input terminals of the AND gate 7-3.

Figure 16:
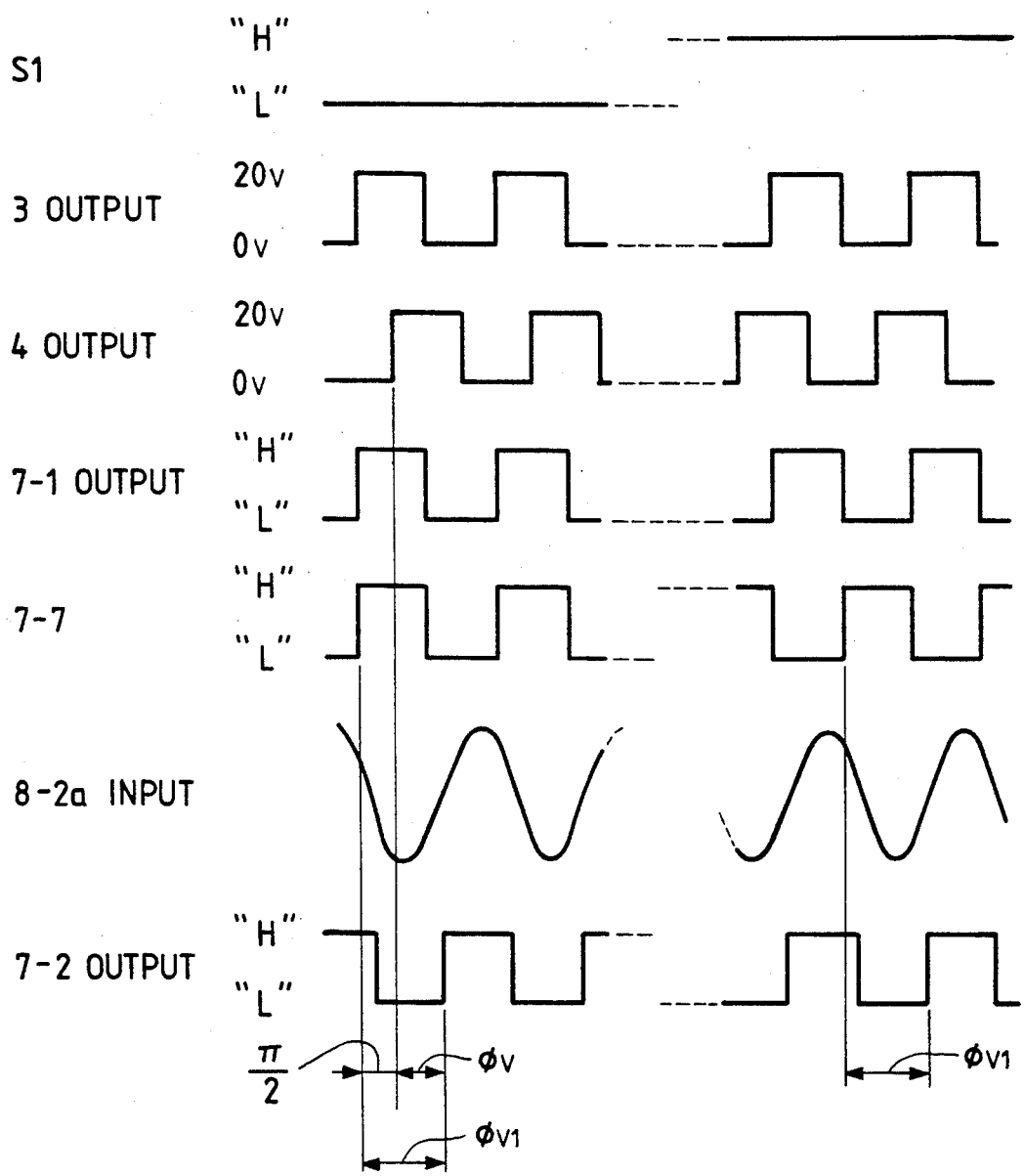
FIG. 16 shows the signal waveforms employed in the sixth embodiment.

Once the direction in which the motor is driven has been changed over by the change-over switch S1, the phase difference relation between the outputs of the power amplifiers 3 and 4 reverses. However, since the output of the waveform shaping circuit 7-1 reverses in accordance with the direction in which the motor is driven, by the function of the exclusive OR gate 7-7, the output of the phase difference measuring circuit 7 is not affected by the direction of the drive. Furthermore, in order to eliminate influence of the shift in the phase between the two signals by $x/2$ on the phase difference measurement, the voltage corresponding to the reference phase difference $\phi v$, set, for example, in the variable resistor VR1 of the drive signal forming circuit 1 shown in FIG. 1, is determined by adding a voltage corresponding to $\pi/2$ to the reference voltage determined when the phase difference between the signals input to and output from one of the inductive elements is to be detected. FIG. 16 shows the waveforms of the individual signals employed in the structure shown in FIG. 15.

It may also be arranged such that a phase difference between the signal output from the power amplifier 4 and the signal applied to the drive electrode 8-2b is detected. Furthermore, the exclusive OR gate 7-7 may in inserted between the waveform shaping circuit 7-2 and the AND gate 7-4.

Furthermore, in a case where the phase difference between the signal $V'_{IN}$ input to one of the inductive elements and the signal $V_{OUT}$ output from the other inductive element is to be detected, as shown in FIG. 15, the phase difference measuring circuit 7 shown in FIG. 7 may be used in place of the phase difference measuring circuit 7A shown in FIG. 5. In that case, the drive signal forming circuit 1, further includes a variable resistor which is used to set the reference phase difference for the drive in one direction and a variable resistor which is used to set the reference phase difference for the drive in the other direction, and a multiplexer whose operation is synchronized with the on/off of the drive direction change-over switch S1 and which is used to select either of the variable resistors.

Seventh Embodiment

Figure 17:
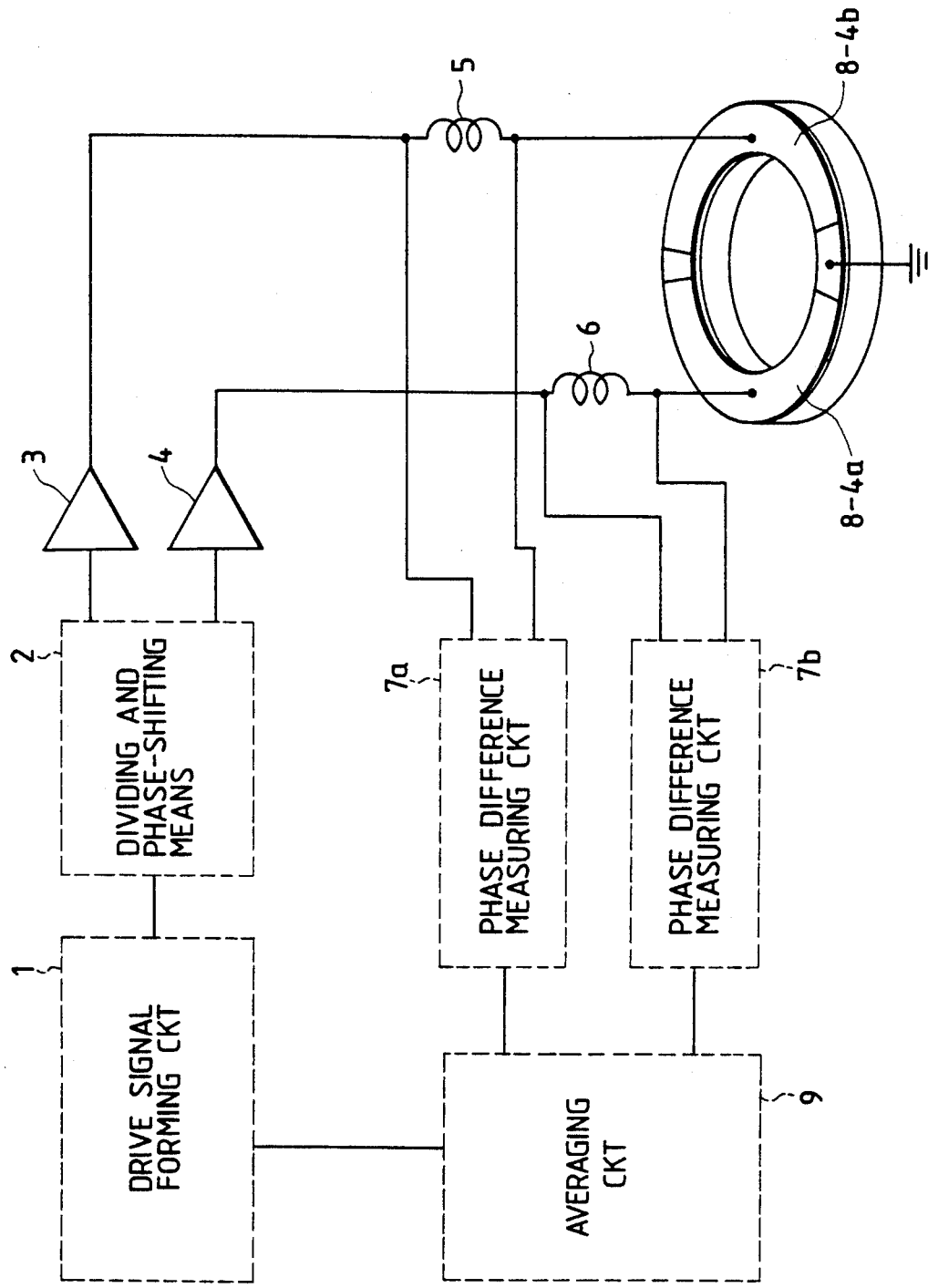
FIG. 17 shows a seventh embodiment of the present invention.

In this embodiment (see FIG. 17), the phase differences of the two signals input to the ultrasonic motor are respectively measured by phase difference measuring circuits 7a and 7b, and the voltages output from the two measuring circuits 7a and 7b are arithmetically averaged by a mean value circuit 9. In this way, it is possible to control the speed of the ultrasonic motor with a higher degree of accuracy.

In the above-described first to seventh embodiments, the phase difference between a signal output from a power amplifier or the secondary winding of a transformer and a drive voltage signal applied to a drive electrode of the ultrasonic motor is detected. However, in a case where the phase difference between the signal output from the dividing phase-shifting circuit 2 and that output from the power amplifier is apparent, a phase difference between the signal output from the dividing and phase-shifting circuit 2 and the voltage signal applied to the drive signal of the motor may be detected for the control of the drive speed of the motor. In that case, if the output of the dividing phase-shifting circuit 2 assumes a logical level, the waveform shaping circuits 7-1 and 7-2 can be omitted.

What is claimed is:

1. A drive device for an ultrasonic motor of the type which includes a stator for generating a travelling vibration wave in an elastic member by the excitation of a piezoelectric member and a rotor brought into contact with said stator, said rotor being driven by said travelling vibration wave, comprising:
   means for forming an alternating drive voltage signal to be applied to said piezoelectric member;
   inductance means connected in series between said drive voltage signal forming means and said piezoelectric member;
   phase difference measuring means for measuring a phase difference between an input and an output of said inductance means; and
   drive control means for controlling a frequency of said drive signal on the basis of the measured phase difference;
   wherein in said drive voltage signal forming means an upper limit of the frequency of the drive voltage signal is set to a frequency at which operation of said ultrasonic motor stops while a lower limit thereof is set to a lower limit of a drive frequency range in which said ultrasonic motor is stably driven.

2. A drive device for an ultrasonic motor of the type which includes a stator for generating a travelling vibration wave in an elastic member by the excitation of a piezoelectric member and a rotor brought into contact with said stator, said rotor being driven by said travelling vibration wave, comprising:
   means for forming an alternating drive voltage signal to be applied to said piezoelectric member;
   inductance means connected in series between said drive voltage signal forming means and said piezoelectric member;
   phase difference measuring means for measuring a phase difference between an input and an output of said inductance means; and
   drive control means for controlling a frequency of said drive signal on the basis of the measured phase difference;
   wherein in said drive voltage signal forming means a frequency of the drive voltage signal with which said ultrasonic motor is started is set between a lower limit of a drive frequency range in which the ultrasonic motor is stably operated and a frequency at which said ultrasonic motor stops.

3. A drive device for an ultrasonic motor of the type which includes a stator for generating a travelling vibration wave in an elastic member by the excitation of a piezoelectric member and a rotor brought into contact with said stator, said rotor being driven by said travelling vibration wave, comprising:
   means for forming an alternating drive voltage signal to be applied to said piezoelectric member;
   inductance means connected in series between said drive voltage signal forming means and said piezoelectric member;
   phase difference measuring means for measuring a phase difference between an input and an output of said inductance means; and
   drive control means for controlling a frequency of said drive signal on the basis of the measured phase difference;
   wherein in said drive voltage signal forming means a lower limit of a frequency of the drive voltage signal with which the motor is started is set to a lower limit of a frequency range in which said motor a stably driven under the conditions that the frequency characteristics of a speed of said ultrasonic motor are the highest, while an upper limit thereof is set to a frequency at which said motor stops under the conditions that the frequency characteristics of the speed of said ultrasonic motor are the lowest.

4. A drive device for an ultrasonic motor of the type which includes a stator for generating a travelling vibration wave in an elastic member by the excitation of a piezoelectric member and a rotor brought into contact with said stator, said rotor being driven by said travelling vibration wave, comprising:

means for forming an alternating drive voltage signal to be applied to said piezoelectric member;

inductance means connected in series between said drive voltage signal forming means and said piezoelectric member;

phase difference measuring means for measuring a phase difference between an input of an output of said inductance means; and drive control means for controlling a frequency of said drive signal on the basis of the measured phase difference;

wherein said drive voltage signal forming means includes a first drive signal forming means for forming a first alternating drive voltage signal to be applied to a first drive electrode of said piezoelectric member and a second drive signal forming means for forming a second alternating drive voltage signal to be applied to a second drive electrode of said piezoelectric member, said first and second alternating drive voltage signals having a predetermined phase difference from each other; and wherein said inductance means includes a first coil inserted between said first drive signal forming means and said first drive electrode of said piezoelectric member and a second coil inserted between said second drive signal forming means and said second drive electrode of said piezoelectric member, and wherein said phase difference measuring means measures a phase difference between signals into and out of one of said first and second coils.

5. A drive device for an ultrasonic motor of the type which includes a stator for generating a travelling vibration wave in an elastic member by the excitation of a piezoelectric member and a rotor brought into contact with said stator, said rotor being driven by said travelling vibration wave, comprising:

means for forming an alternating drive voltage signal to be applied to said piezoelectric member;

inductance means connected in series between said drive voltage signal forming means and said piezoelectric member;

phase difference measuring means for measuring a phase difference between an input and an output of said inductance means; and drive control means for controlling a frequency of said drive signal on the basis of the measured phase difference;

wherein said drive voltage signal forming means includes a first drive signal forming means for forming a first alternating drive voltage signal to be applied to a first drive electrode of said piezoelectric member and a second drive signal forming means for forming a second alternating drive voltage signal to be applied to a second drive electrode of said piezoelectric member, said first and second alternating drive voltage signals having a predetermined phase difference from each other; and wherein said inductance means includes a first coil inserted between said first drive signal forming means and said first drive electrode of said piezoelectric member and a second coil inserted between said second drive signal forming means and said second drive electrode of said piezoelectric member, and wherein said phase difference measuring means measures a phase difference between a signal into one of said first and second coils and a signal out of the other of said first and second coils.

6. A drive device for an ultrasonic motor of the type which includes a stator for generating a travelling vibration wave in an elastic member by the excitation of a piezoelectric member and a rotor brought into contact with said stator, said rotor being driven by said travelling vibration wave, comprising:

means for forming an alternating drive voltage signal to be applied to said piezoelectric member;

inductance means connected in series between said drive voltage signal forming means and said piezoelectric member;

phase difference measuring means for measuring a phase difference between an input and an output of said inductance means; and drive control means for controlling a frequency of said drive signal on the basis of the measured phase difference;

wherein said drive voltage signal forming means includes a first drive signal forming means for forming a first alternating drive voltage signal to be applied to a first drive electrode of said piezoelectric member and a second drive signal forming means for forming a second alternating drive voltage signal to be applied to a second drive electrode of said piezoelectric member, said first and second alternating drive voltage signal having a predetermined phase difference from each other;

wherein said inductance means includes a first coil inserted between said first drive signal forming means and said first drive electrode of said piezoelectric member and a second coil inserted between said second drive signal forming means and said second drive electrode of said piezoelectric member, wherein said phase difference measuring means measures a phase difference between signals into and out of said first coil and a phase difference between signals into and out of said second coil, and wherein said drive device further comprises means for arithmetically averaging the two phase differences so that the frequency of the drive signal is controlled on the basis of the averaged phase differences.

7. A drive device for an ultrasonic motor of the type which includes a stator for generating a travelling vibration wave in an elastic member by the excitation of a piezoelectric member and a rotor brought into contact with said stator, said rotor being driven by said travelling vibration wave, comprising:

means for forming an alternating drive voltage signal to be applied to said piezoelectric member;

a transformer inserted between said drive voltage signal forming means and said piezoelectric member;

phase difference measuring means for measuring a phase difference between said alternating drive voltage signal formed by said drive voltage signal forming means and a signal generated in a secondary of said transformer; and drive control means for controlled a frequency of said drive signal on the basis of the measured phase difference.

* * * * *